Patented Mar. 28, 1950

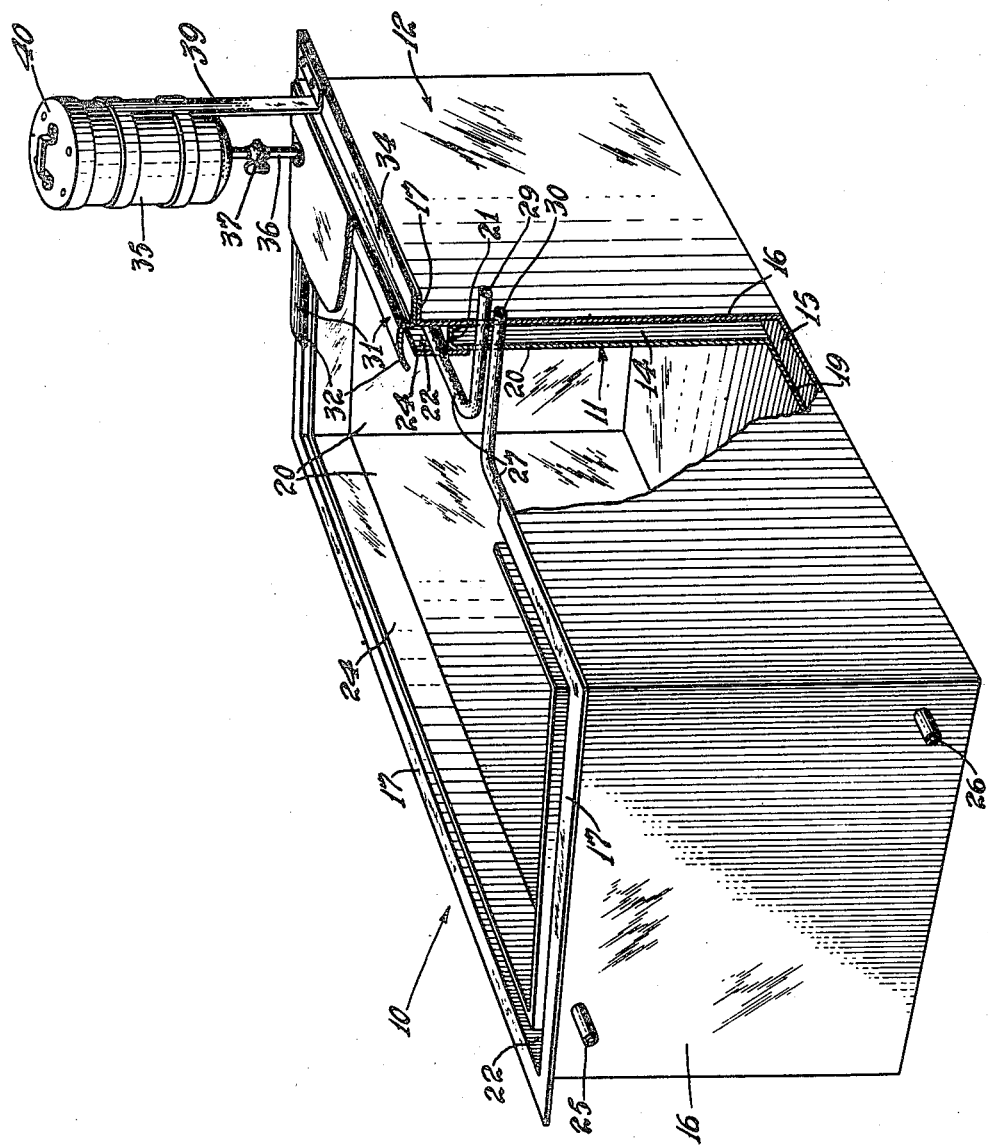

2,501,672

UNITED STATES PATENT OFFICE 2,501,672

DIPPING TANK FOR COATING ARTICLES

Fernand L. Gerin, Montclair, N. J., assignor, by mesne assignments, to Specialties Development Corporation, Belleville, N. J., a corporation of New Jersey Application June 19, 1946, Serial No. 677,871

7 Claims. (Cl. 91—46)

The present invention relates to tanks for coating articles with plastic material, and more particularly to apparatus for maintaining a desired condition of the coating material in the tank.

Heretofore articles have been coated by dipping them in a liquid pool comprising a mixture of a plastic material dissolved in a solvent. Where the plastic material is of the cellulose ester type, such as cellulose acetate butyrate, for example, relatively highly volatile solvents, such as acetone, isopropyl, xylol, or the like, and the application of heat are required to dissolve and maintain the plastic material in solution of proper viscosity.

If such mixtures become too concentrated and/or cool, they have a tendency to gel. Also, evaporation of the solvent from the surface of the pool results in the formation of a surface film. This is very objectionable because the articles would be provided with an inferior coating under such conditions.

An object of the present invention is to provide a simple and efficient apparatus for maintaining the composition of the coating mixture substantially uniformly constant.

Another object is to provide apparatus for preventing the formation of surface films due to the evaporation of the solvent in the coating mixture.

Another object is to provide apparatus for preventing the gelling of the coating composition due to cooling thereof.

Another object is to provide apparatus for maintaining the coating composition in a desired condition which is substantially automatic in operation.

A further object is to provide apparatus for conditioning the coating material to thereby provide an improved coating on the coated articles.

Other and further objects of the invention will be obvious upon an understanding of the illustrative embodiment about to be described, or will be indicated in the appended claims, and various advantages not referred to herein will occur to one skilled in the art upon employment of the invention in practice.

In accordance with the invention, the foregoing objects and advantages may be accomplished by supplying an atmosphere of vaporized solvent at the opening means of the tank through which the articles to be coated are introduced or withdrawn. This atmosphere of vaporized solvent is adapted to substantially charge the atmospheric air which may reach the pool of coating material in the tank to greatly inhibit the evaporation of solvent in the coating material, whereby to maintain its composition and concentration substantially constant and uniform. By the provision of such an atmosphere of vaporized solvent, the vapor pressure above the surface of the pool may be maintained at a value approaching the vapor pressure of the solvent in the coating material at the surface of the pool, thereby greatly minimizing evaporation of the solvent from the pool.

Excellent results are attained by supplying the vaporized solvent at about the same temperature as the temperature at which the pool is maintained. Under certain conditions better results are attainable by supplying the vaporized solvent at a slightly higher temperature than the temperature of the pool.

Also, it has been found that the atmosphere of vaporized solvent above the pool is very beneficial to delay the preliminary hardening of the coating applied to the articles which have been dipped in the pool.

The invention further contemplates metering the solvent to be vaporized at a controllable rate and to direct the vaporized solvent across the surface of the pool to form a blanket of solvent vapor adapted to efficiently prevent air from contacting the surface of the pool.

A preferred embodiment of the invention has been chosen for purposes of illustration and description, and is shown in the accompanying drawing, forming a part of the specification, wherein the single figure is a schematic perspective view of apparatus in accordance with the invention, parts being broken away and shown in section to illustrate details of the apparatus.

Referring to the drawing in detail, there is shown a tank 10 adapted to contain a liquid pool comprising a mixture of a plastic material dissolved in solvent of the types indicated herein for coating articles with a plastic film by immersion of the articles in the pool. The tank 10 may be rectangular in construction, as shown for convenience, or may be of any other suitable shape. The tank 10 comprises inner and outer tanks 11 and 12, respectively, constructed and arranged to provide a heating chamber or jacket 14 for the contents of the inner tank, as about to be described.

As shown in the drawing, the outer tank 12 has a bottom 15 and side walls 16 provided at the upper end thereof with an outwardly extending flange 17. The inner tank 11 has a bottom 19 and side walls 20 which are of less height and width than corresponding side walls of the outer tank. The side walls 20 are provided at the upper end thereof with a channel shaped section 21, a flange of which is secured to the inner side of the side walls of the outer tank in a manner to provide a fluid tight joint between the inner and outer tanks. The channel section 21 is of such dimension to space the side walls 16 and 20 and is secured to the walls 16 of the outer tanks at a position to space the bottoms 15 and 19 of the outer and inner tanks, respectively, whereby to provide the jacket 14.

The channel section 21 has its web below the upper edge of the outer tank 12 to provide the bottom of a trough 22 adapted to contain the solvent to be vaporized as about to be described. The respective side walls of the trough are provided by the upper portion of the side walls 16 and upright members 24 secured in a fluid tight manner to the inner face of the inner tank side wall 20. As shown, the trough extends about the upper end of the inner tank 11 in heat exchange relation with the jacket 14 and the contents of the inner tank, the surface level of which is adapted to be maintained adjacent the upright members 24.

The heating means in the jacket 14 may be in the form of electric heating elements or a liquid medium, such as oil, heated by means not shown, and circulated through the jacket by provision of suitably located inlet and outlet conduits 25 and 26, respectively, in one of the side walls 16. While not shown, it will be appreciated that suitable heat insulation may be provided at the exterior of the outer tank 12.

The solvent contained in the trough is adapted to be vaporized by means of the heat exchange relation between the trough and the jacket and the contents of the inner tank 11. In order to heat the solvent and its vapor to a temperature higher than the temperature of the pool a conduit 27, having an inlet 29 and outlet 30, extends along the bottom of the trough for circulating a heated liquid medium or for containing electrical heating elements.

In order to direct the solvent vapors across the top of the inner tank a shield or cowling 31 is provided which extends around the tank, although only a fragment thereof is illustrated. The shield has a flow directing portion 32 extending inwardly of the upper edge of the upright members 24 and has a flange 34 secured to the flange 17 of the outer tank in a fluid tight manner.

The solvent in the trough 22 is adapted to be supplied or replenished at a metered rate of flow by suitable conduit means in communication with the trough. An illustrative form of such means is shown which comprises a reservoir 35, a pipe 36 extending from the bottom of the reservoir through an aperture in the shield 31, a metering valve or pet cock 37 in the pipe 36, and a bracket 39 for supporting the reservoir, secured to the flange 17 of the outer tank. A cover 40 is provided for the reservoir to prevent evaporation of the solvent stored therein.

In utilizing the apparatus in accordance with the present invention, a liquid pool of coating material is prepared in the inner tank while applying heat by means of the jacket to heat the pool to the temperature at which it is desired to be maintained. Sufficient solvent, preferably the same solvent as used for dissolving the plastic material is supplied to the trough to form a shallow pool therein and the solvent is replenished by supplying the same from the reservoir 35 at a metered rate to make up for the vaporized solvent going into the atmosphere.

The solvent in the trough is vaporized by heat transfer between the jacket 14 and the trough and/or the application of heat through the conduit 27 in the trough. The vaporized solvent rises in the trough and is directed inwardly across the surface of the pool of coating material by the shield portion 32 to provide an atmosphere of solvent vapor over the surface of the pool adapted to exclude atmospheric air, whereby evaporation of solvent in the coating material is prevented.

Articles are then adapted to be dipped into the pool of coating material by introducing and withdrawing them through the opening means provided by the open upper end of the tank 11 to apply a film of coating material thereto. Upon withdrawing the dipped articles from the pool it is desirable to maintain them momentarily in the atmosphere of vaporized solvent just above the pool. This delays initial hardening of the coating film and prevents too rapid hardening which would result in a pocked surface on the coating film applied to the article.

While the present invention has been described in connection with a dipping tank of the manual type, it will be appreciated that features thereof may be applied to dipping tanks of the continuous type. In such type of tank the opening means for introducing and withdrawing the articles to be coated constitute an inlet opening and an outlet opening at opposite ends of the tank through which one strand of a continuous conveyor travels with the articles. Such tanks are covered at the top thereof whereby evaporation of solvent in the coating pool will only occur at the inlet and outlet openings. Evaporation can be effectively inhibited or eliminated by providing apparatus in accordance with the invention at these points for supplying an atmosphere of solvent vapors adapted to exclude atmospheric air from the pool.

It will also be understood that the present invention may be utilized in connection with tanks wherein a transfer roller, brush or the like passes through the coating material and applies the same to articles, sheets or webs contacted by the roller.

From the foregoing description it will be seen that the present invention provides efficient and practical apparatus for conditioning plastic coating compositions in dipping tanks or the like, whereby the disadvantages and objections heretofore encountered are eliminated and a better coating film can be applied to the articles. Once started the apparatus is substantially automatic in operation. Also, the apparatus is simple in construction, can be readily applied to new or existing tanks, and does not require maintenance or repair.

As various changes may be made in the form, construction and arrangement of the parts herein, without departing from the spirit and scope of the invention and without sacrificing any of its advantages, it is to be understood that all matter herein is to be interpreted as illustrative and not in any limiting sense.

It is also to be understood that the following claims are intended to cover all the generic and specific features of the invention herein described, and all statements of the scope of the invention which, as a matter of language, might be said to fall therebetween.

I claim:

1. In combination, a tank having an open upper end, receptacle means for receiving a supply of solvent substantially surrounding said tank adjacent the upper end thereof, and means for heating said receptacle means to vaporize the solvent whereby to provide an atmosphere of solvent adapted to blanket the open end of said tank and exclude atmospheric air therefrom.

2. In combination, a tank, trough means adjacent and substantially surrounding the upper end of said tank for receiving a supply of solvent, means for heating both the contents of said tank and said trough means, and second heating means for heating the contents of said trough to a higher temperature than the temperature of the contents of said tank.

3. In combination, a tank, means for containing a supply of solvent adjacent the upper end of said tank, means for vaporizing the solvent, and means for directing the vaporized solvent from said supply containing means across the top of said tank.

4. In combination, a tank, trough means adjacent the upper end of said tank for receiving a supply of solvent, and a jacket in heat exchange relation with said tank and said trough means for heating both the contents of said tank and said trough means.

5. In combination, a tank having an opening at its upper end, a trough adjacent and substantially surrounding said opening for receiving a supply of solvent, and a heating jacket surrounding said tank and positioned in heat exchange relation with said trough for vaporizing the solvent therein.

6. In combination, a tank having an opening at its upper end, a trough adjacent and substantially surrounding said opening for receiving a supply of solvent, a heating jacket surrounding said tank and positioned in heat exchange relation with said trough for vaporizing the solvent therein, and shield means extending over said trough for directing vaporized solvent from said trough across the opening of said tank.

7. In combination, a tank having an opening at its upper end, a trough adjacent and substantially surrounding said opening for receiving a supply of solvent, a heating jacket surrounding said tank and positioned in heat exchange relation with said trough for vaporizing the solvent therein, and means for supplying the solvent to said trough at a controlled rate.

FERNAND L. GERIN.

REFERENCES CITED

The following references are of record in the file of this patent:

UNITED STATES PATENTS

| Number | Name | Date |
|---|---|---|
| 1,339,400 | Lander | May 11, 1920 |
| 1,662,816 | Bigelow | Mar. 20, 1928 |
| 2,138,578 | Hershberger | Nov. 29, 1938 |
| 2,380,968 | Kimmig et al. | Aug. 7, 1945 |